Figure 1:
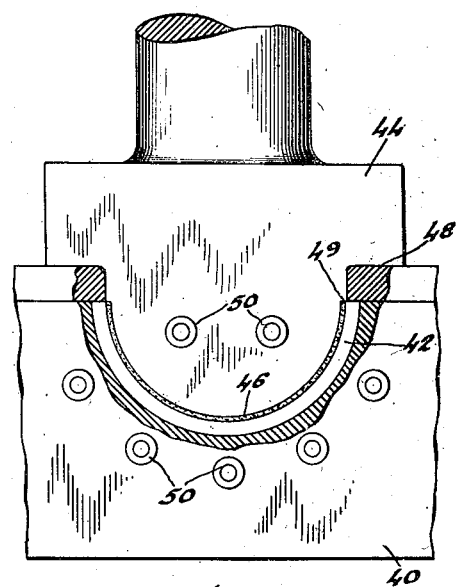

Feb. 26, 1929.                              1,703,177
              C. R. SHORT
    BEARING AND METHOD OF MAKING THE SAME
              Filed March 1, 1926

Inventor
Charles R. Short
By Blackmore, Spencer & Hull
Attorneys

Patented Feb. 26, 1929.

1,703,177

UNITED STATES PATENT OFFICE.

CHARLES R. SHORT, OF DAYTON, OHIO.

BEARING AND METHOD OF MAKING THE SAME.

Application filed March 1, 1926. Serial No. 91,509.

This invention has for its object the production of a bearing which possesses improved wearing qualities both by virtue of its composition and the method of manufacture. My bearing is composed of finely divided particles of aluminum secured to the back, which may be of steel, iron, brass, or any other suitable metal, by the application of pressure of a very high order, preferably accompanied by heating. In order to insure a good bond I have also found it desirable to make use of a bonding agent, preferably phosphor tin, this substance, when in a state of flow, possessing the property of wetting the surfaces to be joined together thus effecting good contact.

The bearing composition above described possesses a higher melting point than the commonly used alloys, is harder, with accompanying reduction in the coefficient of friction, and is a better conductor of heat. Consequently bearings made of this composition will stand greater wear without burning out. The bearing is also characterized by an interrupted surface which provides pockets for the reception of oil thus facilitating lubrication.

The method of making the above described bearing consists in placing a quantity of powdered metal in the bearing back and pressing the metal in place by the use of a properly shaped tool which is moved toward the back and exerts a powerful sidewise pressure on the powdered metal causing it to adhere to the surface of the back, this surface preferably having been previously tinned or otherwise treated to insure a good bond. In most cases also it will be found desirable to accompany the pressing operation with the application of a certain amount of heat so as to cause the particles of metal to cohere and adhere to an extent to produce a good metal union.

Figure 2:
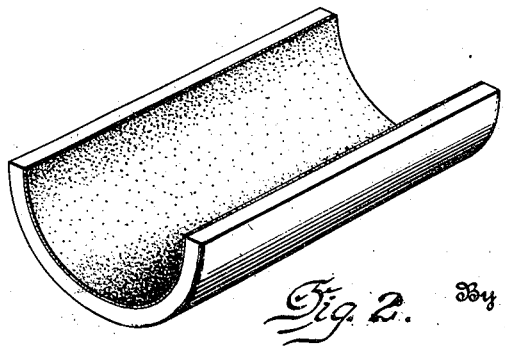

In the drawings:

Fig. 1 illustrates one form of device for lining a semi-circular bearing back with the bearing surface of compressed powdered metal. Fig. 2 shows a complete half bearing.

In Figure 1 I have indicated a device for applying the lining to the bearing back. In this case 40 indicates a suitable die in which the bearing back 42 is received, while 44 is a plunger adapted to force the bearing metal indicated at 46 into place in the back. The die is preferably provided with portions 48 overlying the edges of the back and the plunger is provided with shoulders 49 for engaging the edges of the lining to force it into position. I have also indicated at 50 electrical heating elements which may be imbedded in the die and plunger to permit heating of the parts to the required temperatures for best operation.

The bearing material which I prefer to use consists of a mixture of powdered aluminum and a suitable bonding metal such as phosphor tin preferably in the proportion of 90 parts of aluminum to 10 parts of phosphor tin. As previously stated it has heretofore been discovered that phosphor tin assists in the bonding of metals by causing a wetting of the surfaces to which it is applied. When used as above stated the phosphor tin will assist in bonding the aluminum to the bearing back which has preferably been tinned, and will also assist in securing the particles of aluminum together producing a fairly dense structure.

The proportions given above may be varied. Thus for some classes of service it may be found desirable to use a lesser amount of aluminum for the bearing surface.

Another bonding metal which will be found suitable in practice consists of 98 parts of lead and 2 parts of phosphor tin. These proportions form a good material for bonding aluminum or aluminum alloys to iron or steel as described in application Ser. No. 45,286, filed July 22, 1925, by Harry M. Williams.

The pressure to which the powdered metal is subjected is of a very high order, 60000 to 120000# per square inch being customarily employed in the manufacture of bearings from pulverized materials. In practice 70000 to 90000# per square inch will be found satisfactory, the operation in this case being carried on with the application of heat to the parts, the heat bringing the constituents of the bearing material, or a portion of them, into a plastic condition in which they more readily adhere and are more easily worked.

The finished bearing is indicated in Figure 2. It is characterized by a somewhat interrupted surface which is adapted to hold a small quantity of oil and thus assists in lubrication. The bearing material possesses high heat conductivity; its melting point is higher than the melting point of commonly used antifriction metals such as babbitt; it is harder, the hardness of surface being accompanied by a low coefficient of friction.

All of the qualities above catalogued insure long life and better performance under hard service conditions.

I claim:

1. A device for forming bearings out of powdered metal, comprising in combination, a die member adapted to receive a bearing back; an apertured plate on said die member for holding the bearing back in position within said die member; and a mandrel adapted to enter the die member through the aperture in said plate, said mandrel exerting a radial pressure upon the powdered metal in the die member to compress said powdered metal causing it to flow over said bearing back and adhere thereto.

2. A device for forming bearings out of powdered metal, comprising in combination, a die member shaped to support a bearing back; an apertured plate on said die member for holding the bearing back in position in said die member; a mandrel having a portion adapted to enter the die member through the aperture in the plate, said mandrel having portions overlapping the plate so as to limit its downward movement in order to provide a space between the bearing back and the mandrel when the latter is fully inserted into the die member.

3. A device for lining a semi-cylindrical bearing back with a bearing surface of compressed powdered metal, comprising in combination, a die member having a semi-cylindrical recess for receiving and supporting a bearing back; an apertured plate adapted to be secured on the die member for retaining the bearing back therein; and a mandrel comprising a semi-cylindrical portion of lesser radial dimension than the recess of the die member into which it is adapted to be moved, said mandrel having a flange which is adapted to engage the plate to limit the movement of the mandrel into the die member whereby a space is provided between said mandrel and the bearing back into which space the powdered metal flows when compressed.

4. A device for forming bearings from powdered metal comprising, a die member adapted to receive a semi-cylindrical bearing back, an apertured plate on said die member adapted to project over the bearing back to hold the latter in position in said die member, a mandrel adapted to enter the die member through the aperture in said plate, said mandrel having a projecting flange overlapping said plate to limit the downward movement of the mandrel and a semi-cylindrical lower end of less diameter than the inner diameter of the bearing back whereby a space is provided between the bearing back and the mandrel at the lower limit of movement of the latter, and shoulders formed on the mandrel at the extremities of its semi-cylindrical surface.

In testimony whereof I affix my signature.

CHARLES R. SHORT.